United States Patent Office 3,188,331
Patented June 8, 1965

3,188,331
TIN-CONTAINING FATTY ACID DERIVATIVES
AND PROCESS OF PREPARATION
Gustav Weissenberger, Zurich, Switzerland, assignor to
Monsanto Company, a corporation of Delaware
No Drawing. Filed July 19, 1962, Ser. No. 211,131
Claims priority, application Switzerland, July 21, 1961,
8,582/61
2 Claims. (Cl. 260—414)

The present invention relates to novel tin-containing fatty acid derivatives which are expressed by the following general formula $$R^1R^2R^3Sn—R^4—COOR^5$$

and to a method of making these compounds. In this formula $R^1$, $R^2$, $R^3$ are aliphatic, cycloalphatic, aralphatic, aromatic or heterocyclic radicals, $R^4$ is a hydrogen radical which possesses a straight chain of at least 8 carbon atoms, possibly having branchings and/or ethylenic unsaturations, and $R^5$ is a hydrogen atom, a salt-forming monovalent cation, an equivalent part of a multivalent cation respectively, or a group $R^1R^2R^3Sn$. Normally $R^1$, $R^2$ and $R^3$ will each have not more than 18 carbon atoms and usually not more than 8 carbon atoms; and, normally $R^4$ will have not more than 24 carbon atoms and usually not more than 18 carbon atoms. If $R^5$ is a hydrocarbon radical normally it will not have more than 8 carbon atoms. The preparation of the novel compounds is, in principle, performed by addition of a triorganotin hydride to unsaturated fatty acids. The preparation of a triorganotin hydride by reduction of triorganotin halides with lithiumaluminum hydride or by hydrolysis, ammonolysis, respectively, of alkali triorganostannides is well known. Suitable triorganotin hydrides are, for example, trimethyl-, triethyl-, tri-n-propyl-, triiso-propyl-tin hydride, etc.; tricyclopentyl-, tricyclohexyl-tin hydride, etc.; tribenzyl-tin hydride, etc.; triphenyl-, tri-p(o,m)-tolyl-tin hydride, etc. It is clear that tin hydrides which contain different radicals can likewise be used.

As a second reactant can be used all occurring fatty acids which contain at least one ethylenic or acetylenic bond. Herein, they will shortly be called "unsaturated fatty acids." Examples are: 4-decenoic acid, 9-decenoic acid, 10-undecylenic acid, 4-dodecenoic acid, 9-dodecenoic acid, 4-tetradecenoic acid, 5-tetradecenoic acid, 9-tetradecenoic acid, 9-hexadecenoic acid, 2-octadecenoic acid, 6-octadecenoic acid, oleic acid, elaidic acid, 12-octadecenoic acid, 9-eicosenoic acid, erucic acid, brassidic acid, geranic acid, linoleic acid, linolenic acid, eleostearic acid, etc.; further, acetylenecarboxylic acids, such as 9-undecynoic acid, 10-undecynoic acid, stearolic acid, etc.

The addition proceeds with, e.g., ω-undecenoic acid methyl ester, according to the scheme:

$$CH_2=CH(CH_2)_8COOCH_3+HSnR_3$$
$$\rightarrow R_3Sn(CH_2)_{10}COOCH_3$$

However, the position of the double bond may be optional. The addition is promoted by initiators, like UV-light, azodiisobutyronitrile, etc. According to the reactivity of the unsaturation and the triorganotin hydrides used, it is accomplished at temperatures ranging from about 5° to 120° C., if necessary, by applying pressure. Under the condition used herein there is added to the acetylenic bond, as a rule, one molecule of triorganotin. Thereby, the acetylenic bond is converted into an olefinic bond:

$$CH \equiv C(CH_2)_8COOCH_3+HSnR_3$$
$$\rightarrow R_3SnCH=CH(CH_2)_8COOCH_3$$

More than one triorganotin group can be introduced in multi-unsaturated fatty acids, such as linoleic acid, linolenic acid, etc. However, it has been found that the alkali salts of surface-active triorganotin fatty acids will be more soluble in water if they are still unsaturated.

The triorganotin hydrides also undergo reaction with free carboxylic groups, and the corresponding tin esters are formed with evolution of hydrogen:

$$R—COOH+HSnR_3 \rightarrow R—COOSnR_3+H_2$$

Thus, if in a starting compound a carboxylic group and a double bond are both found, twice an equimolar amount of triorganotin hydride must be used in the reaction, since the carboxylic group reacts before the olefinic double bond. In general, a compound which contains a triorganotin carboxylate group will be prepared cheaper in a manner known per se by reacting the free fatty acid with a triorganotin hydroxide or hexaorganotin oxide, and only then, the triorganotin hydride will be added to the olefinic or acetylenic linkage. The reaction between the carboxylic group and the triorganotin hydride may be avoided by reacting the unsaturated fatty acids in the form of an ester, such as methyl, ethyl, phenyl ester, etc., or a salt, such as sodium, potassium, calcium, barium, aluminum, tin, zinc, mercury, lead salt, etc.

A particularly convenient method is based on the discovery, that the products of invention are also formed when unsaturated fatty acids are treated with alkali triorganostannides. This reaction, proceeding in two steps, may be illustrated by the following equation:

$$CH_2=CH(CH_2)_8COOH+NaSnR_3$$
$$\rightarrow CH_2=CH(CH_2)_8COONa+HSnR_3$$
$$CH_2=CH(CH_2)_8COONa+HSnR_3$$
$$\rightarrow R_3Sn(CH_2)_{10}COONa$$

In carrying out this process, at first a triorganotin halide is converted as usual into the corresponding sodium triorganostannide by elemental sodium, possibly in liquid ammonia as a solvent, or the respective lithium triorganostannide is prepared in a manner known per se from a tin halide and an organolithium compound, possibly in ether-solution. Hereupon, the unsaturated fatty acid is reacted with a stoichiometric portion of the alkali triorganostannide, if necessary, in the presence of initiators. A solvent, such as benzene, toluene, tetrahydrofuran, ether, dioxane, dimethylsulfone, dimethylsulfoxide, liquid ammonia, anhydrous amines, etc., is conveniently used for the reaction.

A modification of this method resides in the fact that, by using unsaturated fatty acid esters, the triorganotin hydride is again prepared in situ and reacts simultaneously. For this purpose, an at least stoichiometrically equivalent amount of an ammonium salt, like ammonium chloride, ammonium bromide, ammonium sulfate, ammonium nitrate, ammonium acetate, etc., must be present in the reaction with alkali triorganostannides. It is understood, that corresponding amine salts may be used as well as ammonium salts, and, if the reaction is not carried out in liquid ammonia, such amine salts may be more advantageous because of their better solubility in organic solvents. The reaction of an unsaturated fatty acid ester with an alkali triorganostannide in the presence of an ammonium salt may be represented as follows:

$$CH_2=CH(CH_2)_8COOR+NaSnR_3+HN_4Br$$
$$\rightarrow R_3Sn(CH_2)_{10}COOR+NaBr+NH_3$$

The products of invention can be used as an active ingredient of pesticides, especially herbicides, insecticides, fungicides and bactericides. For this purpose, they may be dissolved in diluents or mixed with solid carriers. The water-soluble salts are surface-active.

Example 1

1.98 g. (0.01 mole) of ω-undecenoic acid methyl ester are reacted with 3.5 g. (0.01 mole) of triphenyltin hydride at 80° C. in a nitrogen atmosphere. As a catalyst is used 0.5% azo-bis-isobutyronitrile. After a reaction time of 5–8 hours there is obtained the ω-triphenyltinundecanoic acid methyl ester in a 82% yield. The reaction product is recrystallized from methyl alcohol; M.P. 55.5–7° C.

*Analysis.* — $C_{30}H_{38}O_2Sn$, percent Sn calc.: 21.6. Found: 21.3. V.Z. calc.: 102.2. Found: 102.3. V.Z.= saponification value.

The potassium or sodium salt is obtained by heating the ester with KOH or NaOH in ethyl alcohol and evaporation. The excess of alkali is previously separated by conducting in carbon dioxide and filtering of the formed potassium carbonate, or sodium bicarbonate respectively.

From the alkali salts the free tin-containing fatty acids are obtained by acidifying and ether-extraction.

The compounds compiled in the table are obtained in the same manner:

| Compound | M.P., °C., B.P., °C./mm. Hg | $n_D^{20}$ | Percent Yield | Percent Sn Calc. | Percent Sn Found |
|---|---|---|---|---|---|
| $(C_3H_7)_3Sn(CH_2)_{10}$—$COOCH_3$ | 160–161/0.01 | 1.4768 | 45.8 | 26.6 | 26.5 |
| $(C_4H_9)_3Sn$—$(CH_2)_{10}$—$COOCH_3$ | 168–169/0.001 | 1.4758 | 49.2 | 24.3 | 24.4 |
| $(C_6H_5)_3Sn$—$(CH_2)_{10}$—$COOCH_3$ | 55.5–57 | | 82 | 21.6 | 21.3 |
| $(C_4H_9)_3Sn$—$(CH_2)_{10}$—$COOH$ | | 1.4818 | 92 | 25 | 24.5 |
| $(C_4H_9)_3Sn(CH_2)_{10}COOSn(C_3H_7)_3$ | | 1.4960 | | 32.9 | 32.2 |

What is claimed is:

1. A compound of the formula $$R^1R^2R^3Sn—R^4—COOSnR^1R^2R^3$$

wherein $R^1$, $R^2$ and $R^3$ are alkyl radicals each having not more than 8 carbon atoms, $R^4$ is $(CH_2)_{10}$.

2. $(C_4H_9)_3Sn(CH_2)_{10}COOSn(C_3H_7)_3$.

References Cited by the Examiner

Chemical Reviews, vol. 60, No. 5, pages 510 to 512, Oct. 1960.

Kerk et al., J. Appl. Chem., vol. 7, part 7, pages 356 to 365, July 1957.

Kerk et al., J. Appl. Chem., vol. 9, part 2, pages 106 to 113, Feb. 1959.

CHARLES B. PARKER, *Primary Examiner.*